S. W. BICKEL.
ATTACHMENT FOR POTATO PLANTERS.
APPLICATION FILED JAN. 8, 1912.
1,041,580.
Patented Oct. 15, 1912.
2 SHEETS—SHEET 1.
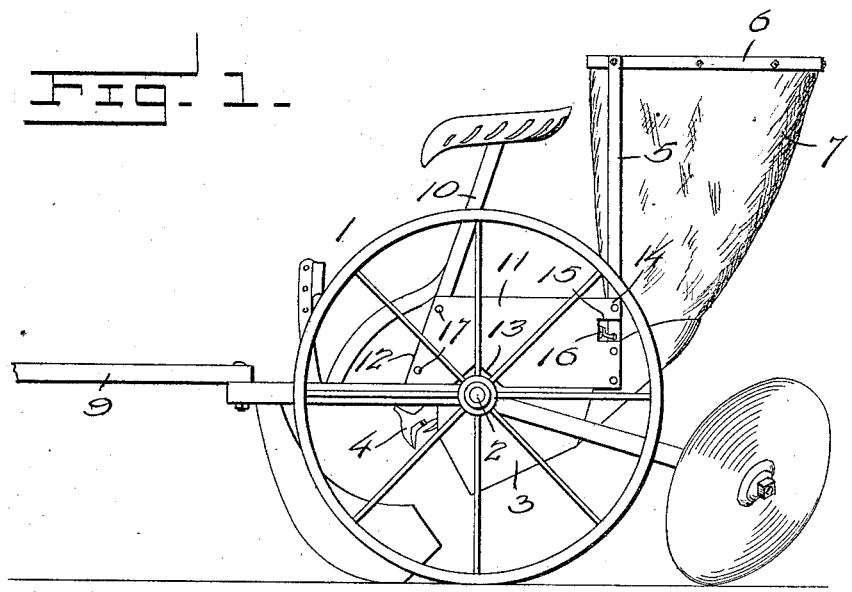
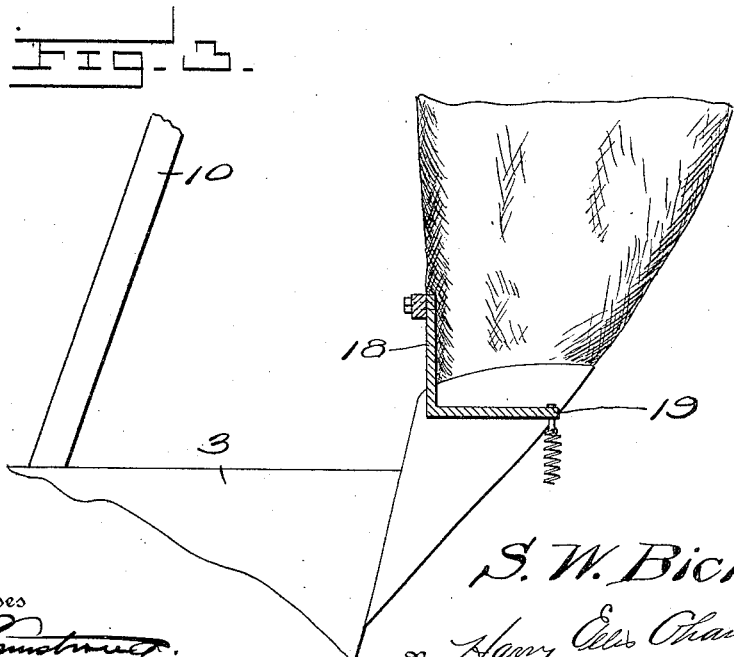
Witnesses
Inventor
S. W. Bickel,
By Harry Ellis Chandler
Attorney S. W. BICKEL.
ATTACHMENT FOR POTATO PLANTERS.
APPLICATION FILED JAN. 8, 1912.
1,041,580.
Patented Oct. 15, 1912.
2 SHEETS—SHEET 2.
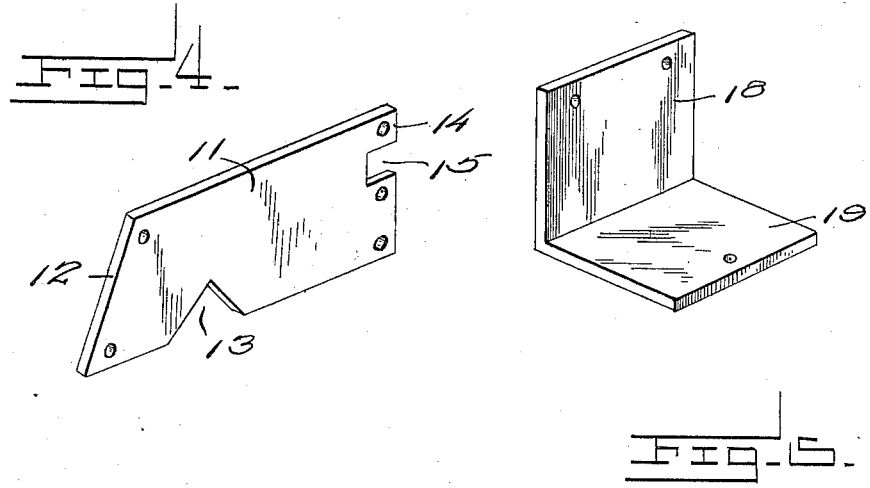
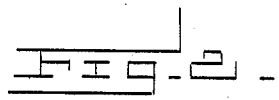
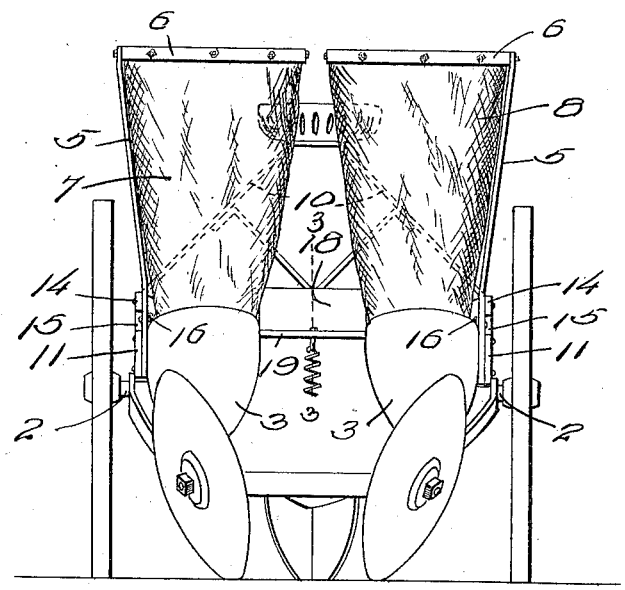

UNITED STATES PATENT OFFICE.

SAMUEL WILLIAM BICKEL, OF NEWTOWN, OHIO.

ATTACHMENT FOR POTATO-PLANTERS.

1,041,580.　　　　　　Specification of Letters Patent.　　　Patented Oct. 15, 1912.

Application filed January 8, 1912. Serial No. 670,051.

*To all whom it may concern:*

Be it known that I, SAMUEL WILLIAM BICKEL, a citizen of the United States, residing at Newtown, in the county of Hamilton and State of Ohio, have invented certain new and useful Improvements in Attachments for Potato-Planters, of which the following is a specification.

This invention relates to attachments to potato planters, and has for its object to provide an attachment which when in position upon the planter will prevent the potatoes from being thrown over the upper edges of the usual hopper employed in devices of this character.

With these and other objects in view, the invention consists in the construction and novel combination of parts hereinafter described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the accompanying drawings: Figure 1. is a side elevation of the planter showing the attachment in place, Fig. 2. is a rear elevation of the same, Fig. 3. is a vertical sectional view on line 3—3 of Fig. 2, Fig. 4. is a perspective view of one of the side plates. Fig. 5 is a similar view of the central plate.

Referring to the drawings the numeral 1 designates in general a frame of a planter, said frame being supported upon a wheeled axle 2, which passes through the hopper 3 of the planter, and has secured rigidly thereto pickers 4 of any well known construction. Rigidly secured to the hopper 3, and at the rear ends thereof are vertical supports 5, to the upper ends of which is secured a frame 6, said frame being adapted to support sack hoppers 7 and 8. Secured at its lower end to the tongue 9 is the seat standard 10, the same being secured in advance of the hopper 3.

A pair of plates 11 are provided, and are formed from sheet metal, one of said plates being adapted to be secured to the right hand side of the planter, and the other to the left hand side, each plate having its inner end beveled, as at 12 in the drawing, and being further provided at its lower edge with a recess 13 to permit the passage of the axle 2 so that the plate may rest upon the upper edges of the sides of the hopper 3. The outer vertical edge 14 of the plates 11 are each provided with a notch 15 so that the rear end of the springs 16 commonly used upon planters of this type may be secured to the vertical supports 5. The inner beveled edge 12 of the plates are secured by bolts 17 to the opposite sides of the seat standard 10, and the outer vertical edges of said plates are secured in a similar manner to the vertical supports 5. An L-shaped plate 18 is also provided and has its inner vertical web bolted to a cross bar of the frame and its outer horizontal web 19 similarly connected to the flange of the usual magazine or receiving hoppers and in which the lower ends of the sack hoppers 7 and 8 enter, thus deflecting the potatoes back into the hoppers 3 if one should be projected from the pickers 4 during the operation of the planter.

From this construction it will be seen that an attachment has been produced which is simple in construction, and one which may be easily and quickly applied to a planter, whereby the loss of potatoes is prevented should they fall from the pickers during the operation of the planter.

What I claim is:

The combination with a potato planter comprising a wheel frame, a hopper carried by said frame, a plurality of pickers rotatably mounted in said hopper, a seat standard mounted on the frame, a pair of vertical supports mounted upon the frame and in the rear of the seat standard, a pair of detachably connected plates mounted upon the upper side edges of said hopper and having their inner ends secured to the seat standard and their outer ends to the vertical supports, said plates having their lower edges formed with recesses to accommodate the axle of the planter whereby potatoes are prevented from being ejected from the picker arms and out of the hopper during the operation of the planter.

In testimony whereof I affix my signature, in the presence of two witnesses.

SAMUEL WILLIAM BICKEL.

Witnesses:
　FLORENCE A. BRAUER,
　AMELIA APPLEGATE.

Copies of this patent may be obtained for five cents each, by addressing the "Commissioner of Patents, Washington, D. C."